(12) United States Patent
Chesla

(10) Patent No.: US 10,601,853 B2
(45) Date of Patent: Mar. 24, 2020

(54) GENERATION OF CYBER-ATTACKS INVESTIGATION POLICIES

(71) Applicant: Empow Cyber Security Ltd., Ramat Gan (IL)

(72) Inventor: Avi Chesla, Tel-Aviv (IL)

(73) Assignee: Empow Cyber Security Ltd., Ramat Gan (IL)

( * ) Notice: Subject to any disclaimer, the term of this patent is extended or adjusted under 35 U.S.C. 154(b) by 311 days.

(21) Appl. No.: 15/245,458

(22) Filed: Aug. 24, 2016

(65) Prior Publication Data

US 2017/0063930 A1    Mar. 2, 2017

Related U.S. Application Data

(60) Provisional application No. 62/209,031, filed on Aug. 24, 2015.

(51) Int. Cl.
*H04L 29/06*    (2006.01)

(52) U.S. Cl.
CPC ...... *H04L 63/1433* (2013.01); *H04L 63/1416* (2013.01); *H04L 63/1425* (2013.01); *H04L 63/20* (2013.01); *H04L 63/1441* (2013.01); *H04L 63/205* (2013.01)

(58) Field of Classification Search
CPC . H04L 63/14; H04L 63/1416; H04L 63/1425; H04L 63/1433; H04L 63/1441; H04L 63/145; H04L 63/20; H04L 63/205; H04L 63/30
See application file for complete search history.

(56) References Cited

U.S. PATENT DOCUMENTS

| | | | |
|---|---|---|---|
| 7,933,989 B1 | 4/2011 | Barker et al. | |
| 8,150,783 B2 | 4/2012 | Gonsalves et al. | |
| 8,572,750 B2 | 10/2013 | Patel et al. | |
| 8,800,045 B2 | 8/2014 | Curtis et al. | |
| 8,813,234 B1 | 8/2014 | Bowers et al. | |
| 9,141,790 B2 | 9/2015 | Roundy et al. | |
| 9,350,750 B1* | 5/2016 | Aval | H04L 63/1416 |
| 2003/0172292 A1* | 9/2003 | Judge | G06F 21/554 726/23 |
| 2004/0114519 A1 | 6/2004 | MacIsaac | |
| 2004/0143756 A1 | 7/2004 | Munson et al. | |
| 2004/0172557 A1* | 9/2004 | Nakae | H04L 63/0227 726/22 |

(Continued)

OTHER PUBLICATIONS

Ross, Malware Analysis for the Enterprise, 25 pages (Year: 2010).*

(Continued)

*Primary Examiner* — Huan V Doan
(74) *Attorney, Agent, or Firm* — M&B IP Analysts, LLC

(57) ABSTRACT

A system and method for generating policies for investigating cyber-security attacks are provided. The method includes selecting at least one entity of interest (EoI); determining at least one detection event associated with the at least one EoI; processing the at least one detection event to create a plurality of investigation rules, wherein each of the plurality of investigation rules includes a set of filters utilized to identify malicious activity related the at least one EoI; and defining an investigation policy for the EoI, wherein the defined investigation policy includes the plurality of investigation rules.

21 Claims, 6 Drawing Sheets

(56) References Cited

U.S. PATENT DOCUMENTS

| | | | |
|---|---|---|---|
| 2004/0250124 A1* | 12/2004 | Chesla | G06F 21/552 726/13 |
| 2005/0193429 A1* | 9/2005 | Demopoulos | G06F 21/552 726/23 |
| 2006/0021050 A1* | 1/2006 | Cook | G06F 21/577 726/25 |
| 2011/0078309 A1* | 3/2011 | Bloch | H04L 29/12066 709/224 |
| 2012/0096549 A1 | 4/2012 | Amini et al. | |
| 2012/0246727 A1* | 9/2012 | Elovici | H04L 41/147 726/23 |
| 2012/0304007 A1 | 11/2012 | Hanks et al. | |
| 2013/0198840 A1 | 8/2013 | Drissi et al. | |
| 2013/0276122 A1 | 10/2013 | Sowder | |
| 2014/0143825 A1* | 5/2014 | Behrendt | G06F 21/552 726/1 |
| 2014/0215618 A1 | 7/2014 | Amit | |
| 2014/0283026 A1 | 9/2014 | Amit et al. | |
| 2014/0283050 A1 | 9/2014 | Amit | |
| 2014/0337974 A1 | 11/2014 | Joshi et al. | |
| 2016/0057166 A1 | 2/2016 | Chesla | |
| 2016/0078365 A1 | 3/2016 | Baumard | |
| 2016/0330226 A1 | 11/2016 | Chen et al. | |

OTHER PUBLICATIONS

The International Search Report and the Written Opinion of the International Searching Authority for PCT/US2015/039664, ISA/RU, Moscow, Russia, dated Oct. 15, 2015.

The International Search Report and the Written Opinion of the International Searching Authority for PCT/US2015/060109, ISA/RU, Moscow, Russia, dated Mar. 10, 2016.

Friedberg, et al., "Combating Advanced Persistent Threats: From Network Event Correlation to Incident Detection", Elsevier, 2014.

* cited by examiner

GENERATION OF CYBER-ATTACKS INVESTIGATION POLICIES

CROSS-REFERENCE TO RELATED APPLICATIONS

This patent application claims priority from U.S. Provisional Patent Application No. 62/209,031 filed on Aug. 24, 2015, the contents of the which are hereby incorporated by reference.

TECHNICAL FIELD

The present disclosure generally relates to cybersecurity systems, and more particularly to generation of investigation policies to allow cyber-threats investigation by cybersecurity systems.

BACKGROUND

The Internet provides access to various pieces of information, applications, services, and the like for publishing information. Today, the Internet has significantly changed the way we access and use information. The Internet allows users to quickly and easily access services such as banking, e-commerce, e-trading, and other services people access in their daily lives.

In order to access such services, a user often shares his personal information such as name; contact details; highly confidential information such as usernames, passwords, bank account numbers, and credit card details; and so on with service providers. Similarly, confidential information of companies such as trade secrets, financial details, employee details, company strategies, and the like are also stored on servers that are connected to the Internet. There is a threat that confidential and/or personal information will be accessed by hackers using unauthorized access methods. Specifically, such methods include, for example, using malware, viruses, spyware, key loggers, a compromised remote desktop services, and the like.

Recently, the frequency and complexity level of attacks has increased with respect to attacks performed against all organizations including, but not limited to, cloud providers, enterprise organizations, and network carriers. Some complex attacks, known as multi-vector attack campaigns, utilize different types of attack techniques to identify weaknesses in the and target network and/or application resources. Identified weaknesses can be exploited to achieve the attack's goals, thereby compromising the entire security framework of the network.

One example for a relatively new type of multi-vector attack campaign is an advanced persistent threat (APT). An APT is an attack in which an unauthorized hacker gains access to a network and remains undetected for a long period of time. Although a multi-vector attack campaign is a complex attack to launch, multi-vector attack campaigns are frequently successful. This is due to the fact that current security solutions are not sufficiently agile and adaptive with respect to detection, investigation, and mitigation of resources needed to meet such evolving threats. Specifically, this is due to the fact that current security solutions cannot easily and promptly adapt to detect and mitigate new attack behavior or attacks that change their behavior in a significant manner in order to bypass the security.

In addition, security solutions and, in particular, solutions for APT attacks, do not provide reliable automatic decision-making capabilities. Typically, security solutions are not designed for both detection and for automatic decision-making. In addition, system administrators do not trust currently available security solutions designed to mitigate complex attacks due, in part, to the high total volume of alerts (events) and the high level of false positive alerts generated by such systems. As a result of such false positive alerts, system administrators (e.g., security experts or officers in organization) often manually perform decision-making processes rather than permit automatic decision-making, which usually increases the time needed to mitigate attacks.

Moreover, the manual decision-making requires system administrators to investigate potential cyber threats or attacks by analyzing thousands of alerts and events generated by different security products deployed in the origination. As such, in most cases, efficient and accurate threat investigation is not feasible or impossible. For example, a task of investigating how an entity was infected, the root-cause of infection, and/or how the entity reacts to the infection cannot be efficiently performed by a system administrator. This due to the fact an administrator would be required to investigate high volume of events (e.g., thousands) in seconds to at least answer such questions. Aside from the high volume of events, as attacks evolve over time, investigation of operations cannot be performed based on out-of-date policies. Such policies, if not dynamically updated, cannot detect correlations that are known a priori between different threats or entities, based on processing of events. Further, an administrator (or security analyst) is incapable of selecting or assigning, in real time, the most effective security solution or solutions to handle a threat based on the current investigation policy. When more than one security solution is used for the investigation, then the order of activation and the right time to activate each solution are also should be determined.

As a result, current solutions cannot perform accurate security investigation operations in real-time, and thus cannot verify if a detected threat is a real ongoing or developing attack or if such threat can harm an organization. Examples for such threats include pre-attack intelligence gathering, malware propagation, data breach, and exfiltration of data. Therefore, current solutions also suffer from a lack of situational awareness of the main risks and loss potential that attacks can impose on an organization or a business.

It would therefore be advantageous to provide a security solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for generating policies for investigating cyber-security attacks. The method comprises: selecting at least one entity of interest (EoI); determining at least one detection event associated with the at least one EoI; processing the at least one detection event to create a plurality of investigation rules, wherein each of the plurality of investigation rules includes a set of filters utilized to identify malicious activity related the at least one EoI; and defining an investigation policy for the EoI, wherein the defined investigation policy includes the plurality of investigation rules.

The embodiments disclosed herein also include a non-transitory computer readable medium having stored thereon instructions for causing one or more processing units to execute a method, the method comprising: selecting at least one entity of interest (EoI); determining at least one detection event associated with the at least one EoI; processing the at least one detection event to create a plurality of investigation rules, wherein each of the plurality of investigation rules includes a set of filters utilized to identify malicious activity related the at least one EoI; and defining an investigation policy for the EoI, wherein the defined investigation policy includes the plurality of investigation rules.

Some embodiments disclosed herein also include a system for generating policies for investigating cyber-security attacks. The system comprises: system for generating policies for investigating cyber-security attacks. The system comprises: a processing circuitry; and a memory, the memory containing instructions that, when executed by the processing circuitry, configure the system to: select at least one entity of interest (EoI); determine at least one detection event associated with the at least one EoI; process the at least one detection event to create a plurality of investigation rules, wherein each of the plurality of investigation rules includes a set of filters utilized to identify malicious activity related the at least one EoI; and define an investigation policy for the EoI, wherein the defined investigation policy includes the plurality of investigation rules.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
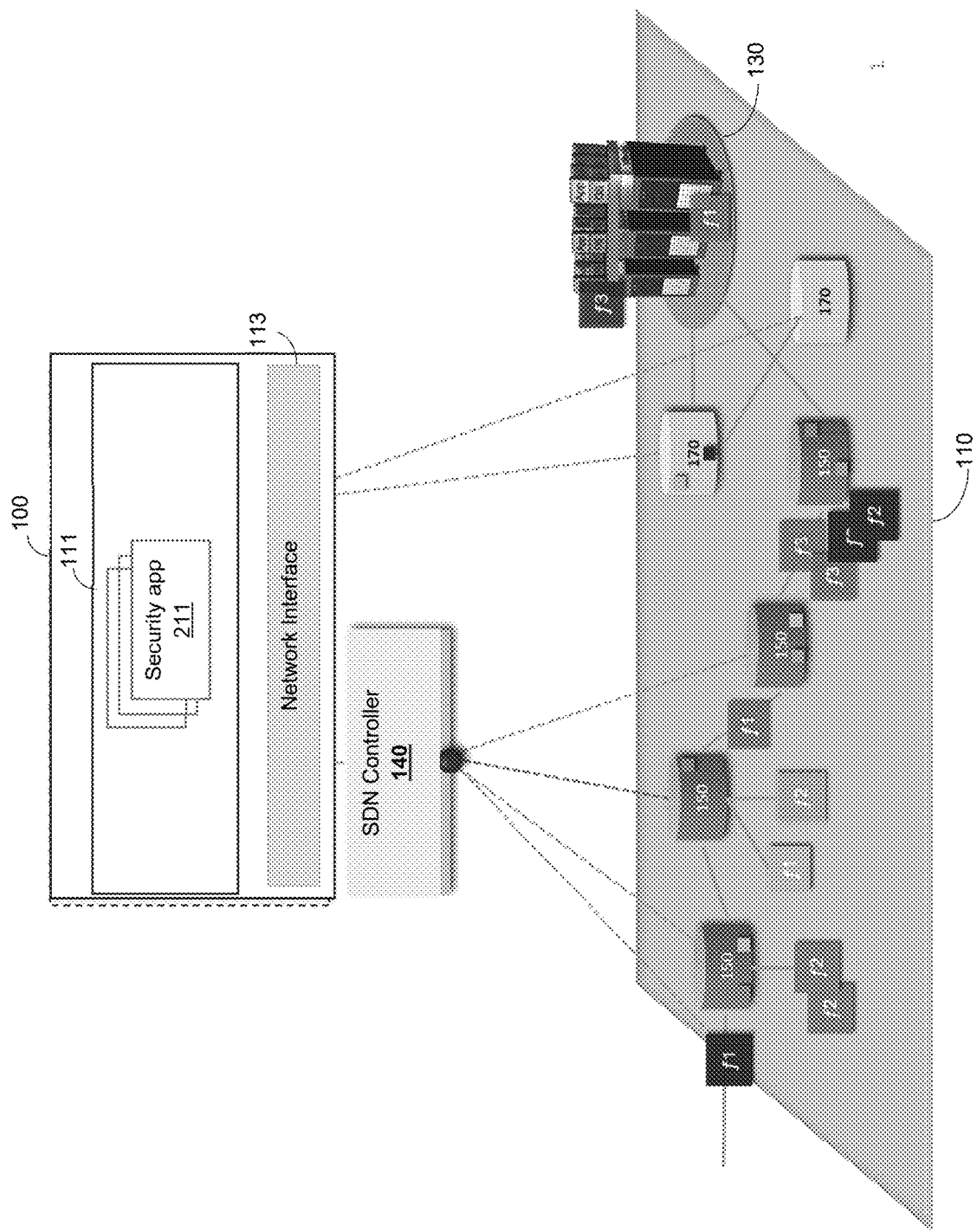
FIG. 1 is a diagram of a cyber-security system utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example, the various disclosed embodiments allow the generation of investigation policies for investigating cyber-attacks. In an embodiment, the generation of an investigation policy is based, in part, on processing of risk-chains, events, or both. A risk-chain is a cyber-attack (attack) lifecycle that may represent different stages in a detected multi-vector attack campaign. An investigation policy includes one or more logical rules (hereinafter "investigation rules").

For each entity under investigation (hereinafter entity of interest or EoI), the investigation rules are utilized to determine or identify past and future activity (malicious or legitimate) with respect to the entity acting as a source or destination. The investigation policies and their rules are generated automatically by processing at least detection events related to the EoI. Such events are generated by security applications in response to signals from various security services communicatively connected to the security products.

FIG. 1 is an example diagram of a cybersecurity system 100 implemented according to one embodiment. The cybersecurity system 100 is configured to protect at least one entity (hereinafter a "protected entity" or "protected objects") 130 communicatively connected in a network 110. In an embodiment, the system 100 is configured to protect the objects 130 through orchestration of a plurality of security products 170 deployed in the network 110. The cybersecurity system 100 is also communicatively connected to the network 110.

A protected entity 130 may include, for example, a L2/3 network element, a server application (e.g., Web, Mail, FTP, Voice and Video conferencing, database, ERP, and so on), "middle box" devices (e.g., firewalls, load balancers, NAT, proxies devices, etc.), SDN controllers (e.g., OpenFlow controllers and virtual overlay network controllers), personal computing devices (e.g., PCs, laptops, tablet computers, smartphones, wearable computing devices, a smart TV, and other devices with internet connectivity (IoT)), and the like. The network 110 may be, but is not limited to, a virtualized network, a software defined network (SDN), a hybrid network, a cloud services network, or any combination thereof.

A SDN can be implemented in wide area networks (WANs), local area networks (LANs), the Internet, metropolitan area networks (MANs), Internet service providers (ISP) backbones, datacenters, and the like. Each network element in the SDN may be a router, a switch, a bridge, a load balancer, a DPI device, and so on, as well as any virtual instantiations thereof. Typically, elements of the SDN include a central controller (e.g. a SDN controller) 140 and a plurality of network elements 150. In certain implementations, the central controller 140 communicates with the network elements 150 using, for example, an OpenFlow protocol, a Netconf protocol, and the like. In an example configuration, the network 110 may be a hybrid network in which a SDN is a sub-network of a conventional network including elements that cannot be programmed by a central controller 140.

In one embodiment, the cybersecurity system 100 is configured to interface with the network 110 through the central controller 140. In another embodiment, the functionality of the cybersecurity system 100 can be integrated in the central controller 140. Alternatively, the functionality of the cybersecurity system 100 is configured to communicate directly with the network elements 150 over a data-plane. This allows implementation of security functions in various locations in the network 110 (e.g., SDN, legacy (non-SDN) networks, or hybrid networks) to protect the protected objects 130.

In an embodiment, security functions are programmed by the cybersecurity system 100 to perform detection, investigation, and mitigation functions (labeled as $f_1$, $f_2$, and $f_3$, respectively, in FIG. 1). The functions are executed during different phases of the operation of the cybersecurity system 100, i.e., detection, investigation, and mitigation phases and independently programmed by the cybersecurity system 100. It should be noted that some or all the functions ($f_1$, $f_2$, and $f_3$) can be implemented or otherwise performed in the network 110. The investigation function may be performed, in part, using investigation policies generated according to the disclosed embodiments.

In an example implementation, the cybersecurity system 100 includes a security stack module 111 and a network interface 113. The security stack module 111 is configured to control and execute the various phases to protect the protected objects 130. Specifically, the security stack module 111 is configured to create, control, program, and execute the security functions ($f_1$, $f_2$, and $f_3$) through a plurality of security applications or "apps" 211, collect attack logs and filter logs.

The security stack module 111 is arranged as a layered model allowing the cybersecurity system 100 to adapt to changes in the protected objects 130 and to ongoing attack campaigns. The security stack module 111 includes in part a collection of security applications 211 and security services (security services not shown in FIG. 1). A security application 211 defines how to detect, investigate, and mitigate a threat to a protected object 130, which specific resources should be utilized for the protection, where the protection should take place, in what order, and so on. A security application 211 can be defined using a set of security services as discussed in more detail herein below.

In an embodiment, the cybersecurity system 100 is configured to allow the creation, definition, or programming of new security applications (or a combination thereof); to modify the functionality of existing applications; and to easily correlate and create workflows between multiple applications. To this end, the security applications 211 and services can be shared or collaborated across different cyber security systems of the same or different companies. A plurality of security applications 211 can be utilized to detect and mitigate an on-going attack campaign. The operation of the security stack module 111 is discussed in greater detail herein below with respect to FIG. 2.

The network interface 113 provides an interface layer of the cybersecurity system 100. Such communication can be with SDN-based network elements or "legacy" network elements (not shown) in the network 110. The network interface 113 supports bi-directional communication drivers to allow communication with the data-plane elements including configurations, policy reading, and logs collection. The drivers support different forms of communication standards and vendors' defined interfaces such as, but not limited to, Netconf, Netflow, BGP, BGP flow spec, SSH, CLIs, DB APIs and more. The drivers enable communication with middle-box devices (e.g., L4-L7 devices and security devices, DPI devices, etc.), end point devices (mobile, host based security applications), server applications, management systems of these devices, combinations thereof, and so on.

The network interface 113 also interfaces with the plurality of security products 170. Such security products 170 are designed to protect against different cyber threats. The security products 170 are utilized to collectively handle a family of cyber-attacks such as, for example, an IDS, an anti-virus, anti-malware, a web application firewall (WAF), a network behavior analysis, and the like. The security products 170 may be provided by the same or different vendors.

In an embodiment, the cybersecurity system 100 is configured to orchestrate the operation of the various security products 170 through execution of the security applications 221. The execution of such security applications 221 requires signals generated by the security services. Such signals are generated in response to attack logs received from the security products 170. Such signals, are generated in response to detecting at least behavior, activity, and the like that indicate a potential attack or the usage of any monitored protected object in the network.

The cybersecurity system 100, in part, using the security stack module 111, is configured to generate risk-chains of multi-vector attacks and to determine a global attack risk level for each such risk-chain. A risk-chain is an attack lifecycle may define different stages in a detected multi-vector attack campaign. The cybersecurity system 100 may be configured to locate, based on a risk-chain, network elements, traffic flows, or both, that are associated with an attack campaign.

A multi-vector attack campaign can be detected or identified by a risk-chain indicating cyber-attacks, such as, but not limited to, an insider threat campaign, a personal data-leak campaign, a ransomware campaign, an intelligence gathering, financial data-leak campaigns, a denial-of-service (DoS) or distributed DoS (DDoS) attack campaigns, and so on.

The cybersecurity system 100 is configured to generate a risk-chain for a specific threat by correlating events generated by the security applications 221 in the security stack module 111. The correlation is performed in part to determine if an attack has advanced from one global threat type (e.g., propagation) to another (e.g., action). Such transition indicates a different stage in the attack campaign and may be a segment in the risk-chain. The processing of events for generating risk-chains are discussed in greater detail below.

The cybersecurity system 100 is designed to activate, deactivate, and correlate between security applications 211 in order to define, create, or otherwise program a robust solution for detecting and mitigating attacks against the protected object. A sequence for activating, deactivating, and correlating the various functions and modules of the cybersecurity system 100, is based on one or more workflow rules and one or more risk-chains. A workflow rule and generated risk-chain may define, e.g., scopes of operation of the various phases' functions (investigation phase functions, mitigation phase functions, etc.).

Each security application 211 is configured to correlate feeds received from other security applications 211, thereby making the security decision-making process holistic and context-based. That is, each security application 211 is configured to correlate decision outputs from different security application types before making a final security decision. The correlation of various feeds is based on a set of workflow rules which are processed and applied by a security application 211. In an embodiment, the set of workflow rules are defined by the user. In another embodiment, a security application is configured to perform machine learning to define or otherwise select a set of workflow rules to execute. In yet another embodiment, a security application 211 can override workflow rules or define new workflow rules based on the generated risk-chains. The workflow rules are set respective of the attacks that the cybersecurity system 100 can handle. That is, in an example implementation, a set of workflow rules is defined for each different type of threat.

According to the disclosed embodiments, the cybersecurity system 100 is further configured to generate investigation policies. To this end, a security application 211 in the module 111 is configured to process detection events and define or otherwise create investigation policies in response to such processing. Each such policy is related to an EoI.

In one embodiment, an EoI may be an entity designated in a risk-chain. In another embodiment, an EoI may be an entity that is a source, destination, or both, of any communication detected by an event. The investigation policy may include investigation rules that allow examination of at least malicious activity sourced from an entity or targeted to the entity at a past, current, and further timeline. For example, the investigation rules can examine events to determine "what has happened to a source entity A?"; "what will happen to a source entity A?; "what did a destination entity A perform?"; and "what will a destination entity A perform?". An entity being investigated (i.e., an EoI) may include, for example, a host device, a user, an application, or any other entity that can receive or send communications. As will be discussed below, each investigation rule includes a set of filters to determine what should be investigated and when.

During the investigation stage, attack logs are investigated by security engines (included in the module 111) based on the generated policies. To this end, the security engines receive attack logs from one more of the security products 170. In an embodiment, the attack logs are normalized into a unified structure across the different security products 170.

In another embodiment, the cybersecurity system 100 is configured to select from among the security products 170 to use a source for the attack logs during the investigation. The selection is based on a performance score computed for each security product 170. The performance score may be based on offline security performance, runtime security performance, or both of each product.

Figure 2:
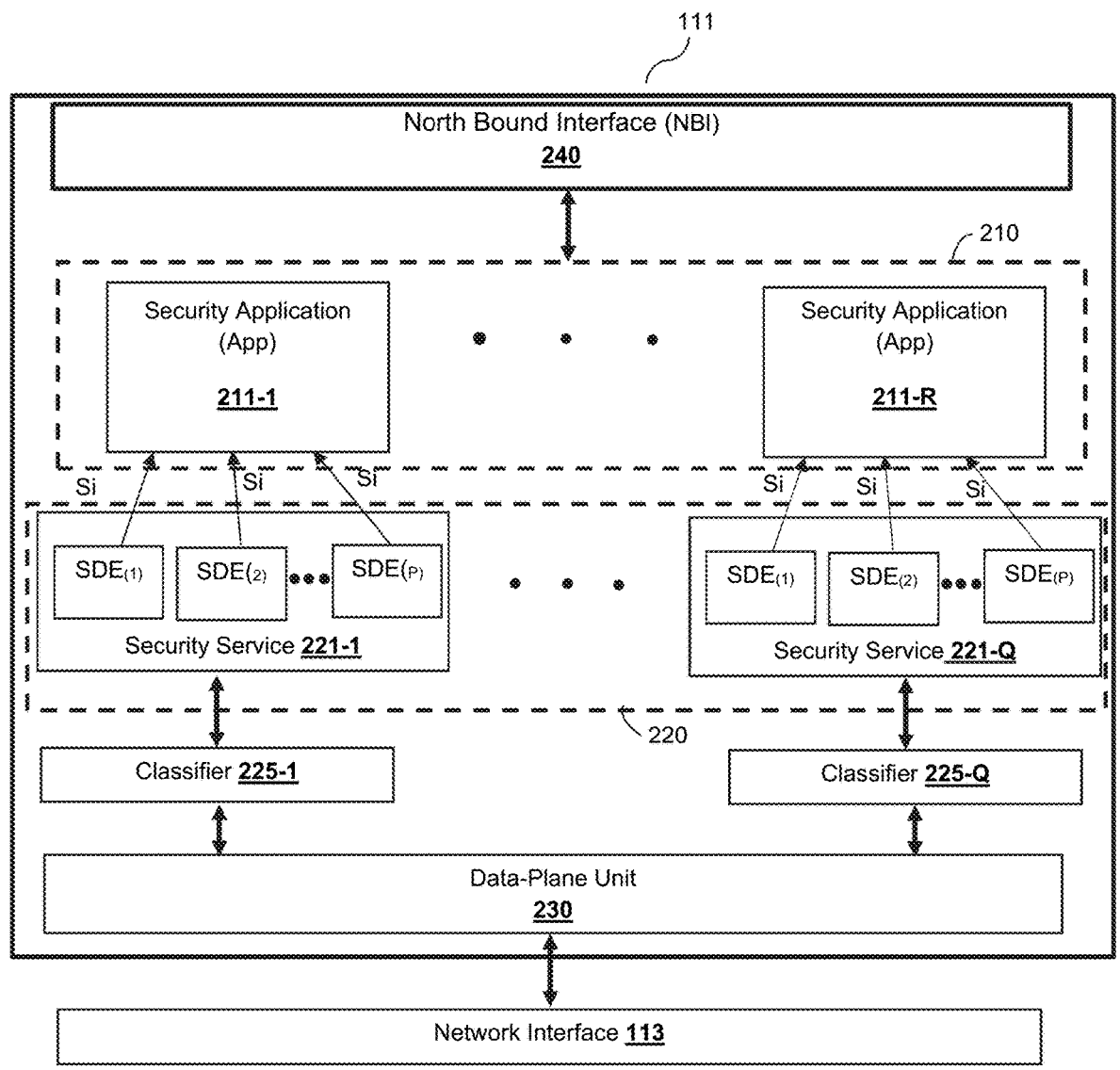
FIG. 2 is a block diagram of a security stack module implemented according to an embodiment.

FIG. 2 shows an example block diagram of the security stack module 111 implemented according to one embodiment. In an example implementation, the security stack module 111 includes the following units: a security application unit 210, a security services unit 220, a data-plane unit 230, and a northbound network interface (NBI) 240.

The security services unit 220 hosts a plurality of security services 221-1 through 221-Q (hereinafter referred to individually as a security service 221 and collectively as security services 221, merely for simplicity purposes), each security service 221 being reusable across different security applications 211-1 through 211-R (hereinafter referred to individually as a security application 211 and collectively as security applications 211, merely for simplicity purposes). Thus, different security applications 211 (each one for a different purpose) can utilize the same or different security services 221 for their respective needs.

The security application unit 210 includes the security applications (apps) 211. Each security application 211 represents a different type of security protection or function. For example, a security application 211 can be configured to handle an insider threat campaign, a personal data-leak campaign, a ransomware campaign, an intelligence gathering, financial data-leak campaigns, a denial-of-service (DoS) or distributed DoS (DDoS) attack campaigns, and so on. Each security application 211 can be updated according to evolving security needs. Updating the security application 211 may include, but is not limited to, reconfiguring the security application 211. In an embodiment, the security application unit 210 is preconfigured with a set of security applications 211. Additional security applications 211 can be added or removed from the security application unit 210 as needed.

In an embodiment, a security service 221 represents a cyber-solution category. A security service 221 can execute a plurality logical security functions defined to handle a specific cyber-solution category. Each such category typically utilizes different type of security technologies and thus supports different types of attack detection, investigation, and/or attack mitigation rules.

Examples of security services 221 that can be maintained and executed by the security services unit 220 include a network behavior anomaly (NBA) security service, a sandbox (e.g., anti-malware) security service, a reputation security service, an intrusion detection system (IDS) security service, a challenge-response security service, an anti-virus (AV) security service, and a Web application (WAF) security service. Examples for the functionality of the security services 221 can be found in co-pending U.S. patent application Ser. No. 14/615,020 (hereinafter the '020 application) to Chesla, assigned to the common assignee, which is hereby incorporated by reference for all that it contains.

Each security service 221 includes one or more security decision engines $SDE_{(1)}$ through $SDE_{(P)}$ (hereinafter referred to individually as a SDE and collectively as SDEs, merely for simplicity purposes). The SDEs may be programmable or preconfigured. A security service 221 is configured to use a set of pre-defined SDEs, to import SDEs, to create and share a new SDE, or a combination thereof. A SDE represents a logical threat protection category within the security service. The creation and modification of such SDEs can be performed via a programming language, threats classification processes designed to automatically populate an SDE with security rules (e.g., IDS attack signature rules) per threat, and so on. The security decision engines, and therefore the security services 221, can allow the cybersecurity system 100 to adapt to new threats, new attack behaviors, unknown behaviors, or attacks that utilize new evasion techniques.

A security service 221 is configured to generate a plurality of signals (Si) based on its various SDEs. Such signals are generated in response to detecting at least behavior, activity, and the like that indicate a potential attack or the usage of any monitored protected object in the network. In order to generate signals, each SDE is configured to receive and process traffic flows, alerts, and logs, each of which is provided by any network element (150, FIG. 1) or security product (170, FIG. 1). Such information (collectively referred to as "attack logs") is received at the security services 211 through the data-plane unit 230 and the north bound interface 240.

In an example embodiment, a classifier 225 of the classifiers 225-1 through 225-Q (hereinafter referred to individually as a classifier 225 and collectively as classifiers 225, merely for simplicity purposes) is communicatively connected to each security service 221. The classifier 225 is configured to at least classify the attack logs generated by the security products (170, FIG. 1) to one security engine (SDE) that can best handle the threat. Each classifier 225 is further configured to normalize the attack logs into the unified data structure. This allows for investigation and detection of data that is agnostic to the underline security technology of products generating the attack logs.

Examples for the functionality of a classifier 225 can be found in co-pending U.S. patent application Ser. No. 15/227,571 to Chesla (hereinafter the '571 application), assigned to the common assignee, which is hereby incorporated by reference for all that it contains.

The data-plane unit 230 provides central control of the data-plane resources, such as routers, switches, middle-box L4-L7 and security devices, and so on. In an embodiment, the data plane unit 230 is configured to allow the security services 221 to retrieve and store the required network and application information from such data plane resources as well as to enforce security network control actions.

The data-plane unit 230 can perform networking functions such as topology discovery, traffic monitoring (copy services), traffic redirection functions, traffic distribution (L2, L3 load balancing for scaling out resources), management of quality of service (QoS) actions in the network elements, and the like. In some example implementations, certain functions provided by the data-plane unit 230 can be implemented in the central SDN controller 140. Examples for such functions may include, but are not limited to, redirection, copy, QoS, and data collection.

The north bound interface 240 is configured to interface between the security stack module 111 and one or more external systems or elements (not shown). The external systems may include, for example, third party security analytics systems, security portals, datacenter orchestration systems, identity management systems (e.g., domain controllers, DNS, DHCP, etc.), or any other system or element that can provide information to the security stack module 111. This enables a wider context-based security decision making process.

The north bound interface 240 may include standard interfaces, such as CLI, REST APIs, or a Web user interface, as well as drivers that are already programmed for control, configuration, monitoring, or a combination thereof of specific third party systems, and so on.

The various units and modules of as well as the security stack module 111 are communicatively interconnected through a predefined set of interfaces APIs. As a result, the cybersecurity system 100 is fully programmable and configurable. The interfaces and APIs may be designed to be unidirectional, bidirectional, or configured for one-to-many bi-directional flows of information.

According to the disclosed embodiments, each security application 211 is configured to generate investigation policies to be enforced by one or more SDEs in a security service 221. To this end, a security application 211 is configured to generate events (hereinafter "detection events") based on signals received, during a detection phase, from one or more of the security services 221. The events are generated using a set of event rules. Event rules can be applied to a signal's value, a duration, a frequency, and so on, or any combination thereof. The generation of events in response to signals are discussed in greater detail in the above-referenced '020 application.

As an example, detection events are generated, for example, in response to signals received from SDEs in the security services 221 that monitor data-leak activity (e.g., drop-point activity, abnormal data transfer, exfiltration patterns upload behavior, etc.), signals that indicate DoS or DDoS incidents, and so on. Others examples for detection events include events indicative of command-and-control (C&C) activity, abnormal usage of remote command and execution channels events, privileges escalation activity, malware spreading network activity, vertical and horizontal scans, manual probes of identity services, phishing, spear phishing, and access to malware sites activity, and the like.

Each security application 211 is configured to process the (un-filtered) detection events detect or otherwise select at least one EoI. For example, if an event is generated in response to a detected malicious communication from a source host to a destination host, the source host may be selected as the EoI. It should be noted that any host can be equally selected (source, destination, or both).

In an embodiment, the selection is performed based on a set of investigation trigger rules. The set of investigation trigger rules define which detection events should trigger investigation and which entity designated in such event should be selected as the EoI. For example, for a scan event on a specific host (e.g., vertical port scan), the host will be selected as the EoI. In another embodiment, the selection is based on a risk-chain, discussed in detail below. An entity may be designated, in an event or a risk-chain, by a host name, an IP address, a user name, a group of IP addresses, and the like. The designated entity may be selected as the EoI.

Figure 3:
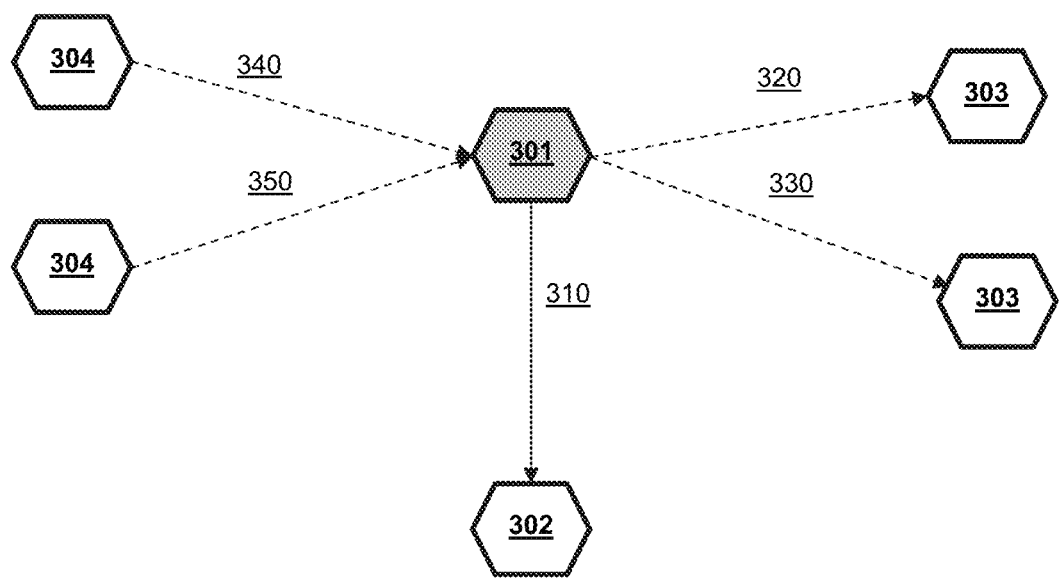
FIG. 3 is a diagram illustrating the relationships between entities, events and investigation rules according to an embodiment.

Upon determining a detection event and its EoI, the detection event is analyzed to create an investigation policy. This analysis is further demonstrated with reference to FIG. 3.

A detection event 310 is between entities 301 and 302. In this example, the entities 301 and 302 are source and destination hosts, respectively, and the entity 301 is the EoI. That is, an investigation policy is generated for the entity 301.

In an embodiment, the investigation policy for the entity 301 includes rules for investigating the entity 301 while acting as a source and as a destination. Acting as a source, the investigation policy attempts to look at future events (demonstrated by a line 320) to determine what activity the entity 301 will perform on any destination entity (303). Further, the investigation policy attempts to look at past events (demonstrated by the line 330) to determine what activity the entity 301 performed on any destination entity (303).

Acting as a destination, the investigation policy attempts to look at future events (demonstrated by the line 340) to determine what will happen to the entity 301 by any source entity (304). Further, the investigation policy attempts to look at past events (demonstrated by the line 350) to determine what has happened to the entity 301 by any source entity (304).

The investigation policy includes a set of rules. Each such rule may have one of the following example formats:

1. Search for Events:
    Occur at $T<T_{current}$;
    Destination=EoI;
    Source=Any;
    SDE=$SDE_{(j,k)}$
2. Search for Events:
    Occur at $T>T_{current}$;
    Source=EoI;
    Destination=Any;
    SDE=$SDE_{(j,k)}$ Example 1 is for past events where the destination is the EoI (e.g., the entity 301) from any source. Example 2 is for future events where the source is the EoI and any host can be the destination. $T_{current}$ is the time at which the detection event occurs. The SDE is the SDE(j) in a security service (k) that is assigned to the investigation. It should be noted that any additional filters can be defined such as, any combination of source and destination as the EoI, a specific source or destination, an application path, and so on. It should be further noted that more than one SDE can be assigned to performed the investigation. The application path is layer-3 to layer-7 protocols of a traffic flow from one entity to another. For example, an application may be IP:TCP:HTTP: GMAIL or a IP:UDP:DNS.

Returning for FIG. 2, the one or more SDEs to be applied are determined based in part on the detection event. Specifically, the SDE (hereinafter a "detector SDE") that was a source to the detection event is determined. The at least one SDE (hereinafter an "investigator SDE") is selected based on the detector SDE. It should be noted that the detector and investigator SDEs may be the same SDE. It should be further noted that the detector and investigator SDEs may reside in the same or in different security services 221.

The determination of a respective investigator SDE, may be based on correlation of a detector SDE to an investigator detector SDE. Such correlation can be performed in real-time based on logical connections between SDEs, a type of threats to be analyzed, timing of the detection event, and so on. In another embodiment, the correlation is based on a set of predefined mapping rules that map a detector SDE to one or more investigator engines.

A logic connection between SDEs is determined based on a global threat type. Specifically, attack logs are classified (automatically) by a respective classifier 225 into a SDE in a security service 221. Each SDE is configured to handle a specific global threat type. Thus, each event is generated based on signals from a SDE associated with a global threat type. A global threat type defines a certain type of malicious activity and may include, for example, action, control, propagation, probe, and social engineering.

The logical connections, and thus the mapping of a detector SDE to an investigator SDE, are determined based on a global threat type that each SDE is configured to handle. The following non-limiting example tables (Table 1 and Table 2) demonstrate the detection to investigation logical connections based on the global threat types, and thus the mapping of between SDEs is determined based on a global threat type.

TABLE 1

| | | Investigator SDE | | | | |
|---|---|---|---|---|---|---|
| Global Threat Type | | 1 Social | 2 Probe | 3 Propagation | 4 Control | 5 Action |
| Detector SDE | 1 Social | | | | | |
| | 2 Probe | √ | | | | |
| | 3 Propagation | √ | √ | | | |
| | 4 Control | √ | √ | √ | √ | √ |
| | 5 Action | √ | √ | √ | √ | √ |

Table 1 demonstrates a potential mapping to investigate past events (events occurred before a current detection event). As an example, a detector SDE configured to handle a Propagation threat type is mapped to an investigator SDE configured to investigate Social and Probe threat types.

TABLE 2

| | | Investigator SDE | | | | |
|---|---|---|---|---|---|---|
| | | 1 Social | 2 Probe | 3 Propagation | 4 Control | 5 Action |
| Detector SDE | 1 Social | | √ | √ | √ | √ |
| | 2 Probe | | | √ | √ | √ |
| | 3 Propagation | | | | √ | √ |
| | 4 Control | | | | √ | √ |
| | 5 Action | | | | √ | √ |

Table 2 demonstrates a potential mapping to investigate future events (events occurred after a current detection event). As an example, a detector SDE configured to handle a Probe threat type is mapped to an investigator SDE configured to handle Propagation, Control, and Action threat types.

It should be noted that each SDE, and specifically detector and investigator SDEs are configured to process attack logs to generate signals. Such signals are then transformed into events. Thus, processing of events (future or past) include processing attack logs related to or associated such events.

An SDE can be further configured to detect or investigate a specific activity type of a global threat type. As an example, if the detector SDE is a malicious URL SDE (related to a propagation global threat type) in a reputation service, the investigator SDE may be any, some, or all of: a zero-day malware SDE (related also to a propagation global threat type) in the anti-malware security service and command-and-control SDE (related to a control global threat type) in the reputation security service. In this example, each investigator SDE investigates future events.

As another example, if the detector SDE is an exfiltration security SDE (related to an action global threat type) in an IDS security service, the investigator SDE may be any, some, or all of: a network scan SDE (related to a probe global threat type) in a IDS security service; a zero-day malware SDE (related to a propagation global threat type) in a sandbox security service; and a command-and-control SDE (related to a control global threat type) in a reputation service. In this example each investigator SDE investigates historical (past) events.

It should be noted that the name of the SDE may be utilized to indicate the type of threat that the engine detects or investigates. As an example, a zero-day malware SDE generates signals (later correlated to events) may be related to zero-day malware activity (i.e., anomaly without a definitive impact). It should be appreciated that the SDEs and services are operable according to the disclosed embodiments, but the scope of the disclosed embodiments is not limited to the examples provided herein.

Each investigator SDE is configured to carry out the respective investigation policy. Such SDE can operate during an investigation phase of the cybersecurity system 100.

In an embodiment, each security application 211 is configured to select specific security product(s) to be used during the investigation. That is, attack logs generated by only the selected products will be processed by the investigator SDEs. The selection of security products is based, in part, on a performance score computed for each such product by the classifiers 225. The performance score may be based on offline performance, runtime performance, or both, of each product.

In an embodiment, each security application 211 is further configured to generate risk-chains. In addition, for each generated risk-chain, a security application 211 is configured to compute or determine a risk level for each segment in the risk-chain and an attack risk level for the risk-chain. A risk-chain is an attack lifecycle.

To this end, a security application 211 is configured to process detection events using a set of risk-chain generation (RCG) rules. The RCG rules may be specific for each application 211, for each specific tenant (protected object) protected by an application 211, for each attack-type, for a combination thereof, and so on. As will be discussed in detail below, the set of RCG rules includes threat-mapping rules and matching rules applied on the received events.

In an embodiment, a security application 221 is configured to map, using the threat mapping, each detected event to a global threat type. A global threat type is associated with a risk-chain group. A global threat type defines a certain type of malicious activity and includes at least any of an action, a control, a propagation, a probe, and a social engineering. The mapped events are correlated to determine at least a transition between one global threat type to another. The correlation is performed using the matching rules. When, such a transition is detected, a data structure maintaining data of at least one risk-chain is updated. The process for generating risk-chain as performed by a security service is further discussed herein below with reference to FIG. 6.

A risk-chain is constructed to include the global threat types and segments. A segment may represent a transition from one global threat type to another or a self-loop in a global threat type. A segment may be, for example, a transition from a propagation global threat type to an action global threat type.

A segment may be maintained or otherwise displayed with a set of parameters including at least a segment ID, a segment risk level, a respective detection event (or events), a global threat type, and the like. In addition, a risk-chain may be associated with an attack risk level. The attack risk level may be based on, but not limited to, a function of any of the segments' risk levels, a number of segments, and a cause-and-effect counter value. Any risk-chain generated using the disclosed embodiments represents a cyber-attack or a phase during an attack.

In another embodiment, each global threat type may be maintained with metadata including events designated entities (e.g., hosts) that caused or affected the respective threat type. Therefore, in an embodiment, a risk-chain can also be presented as a set of entities and logical connections between such entities. The logical connections are based on the events generated by the security application.

Figure 4:
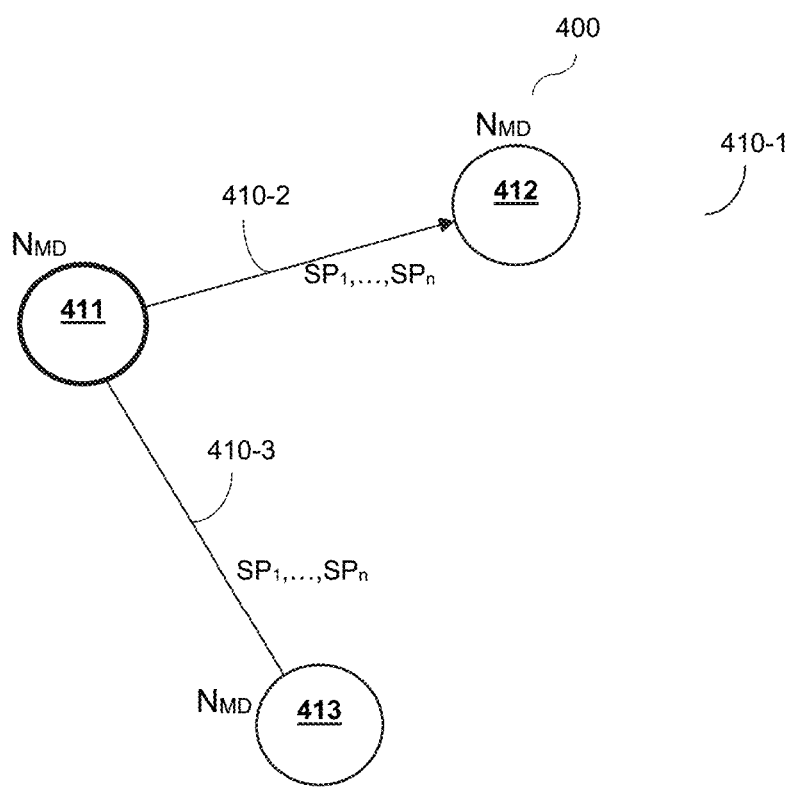
FIG. 4 is a schematic diagram of a risk-chain pattern.

An example diagram illustrating a risk-chain 400 is shown in FIG. 4. The risk-chain 400 includes three segments 410-1, 410-2, and 410-3. Each segment is created in response to satisfying a matching rule as defined in greater detail below. The nodes (vertices) 411, 412, and 413 include the global threat types. For example, nodes 411, 412, and 413 are a probe threat type, a propagation threat type, and an action threat type, respectively. The node metadata (NMD) may include least the respective entities (e.g., hosts) that caused or affected the respective threat type.

The segments 410-2 and 410-3 represent transitions from one type of threat to another. The segment 410-1 is a self-state segment. Each of the segments 410-1, 410-2, and 410-3 is maintained or displayed with its respective segment parameters (SP1, . . . , SPn).

Returning again to FIG. 2, according to an embodiment, a security application 221 is configured to select an EoI based on a generated risk-chain. That is, one or more entities associated with global threat types may be utilized as the entities of interest for which investigation policies will be generated. Upon selection of an EoI, security application 221 is configured to identify the detection event which caused the inclusion of the entity in the risk-chain (for example, using the segment connected to a node representing an entity in the risk-chain). Then, the security application 221 is configured to process the detection event in order to generate an investigation policy.

It should be appreciated that risk-chains are helpful for handling APT attack campaigns. Thus, the generation of investigation policies based on risk-chains allows for accurately detecting malicious activities and quickly acting thereupon. This further allows for reducing a number of false positive alerts and increasing the certainty of the attack. This is mainly due to the fact that, during APT attack campaigns, the attack includes different stages and multi-vector attacks with in each stage, that involves many independent network elements participating in an attack. Investigation of the various vectors within and cross attack stages involve many security solutions, typically silos (not integrated with others), and therefore the relation between any two or more malicious activities, is not immediately apparent.

It should be noted that modules in the cybersecurity system 100 and the units 210, 220, and 230 in the security stack module 111 are independent. Thus, any changes in one unit or module do not necessarily result in any changes to the other modules.

Each, some, or all of the modules of the cybersecurity system 100 and the various units of the security stack module 111 may be realized by a processing circuitry or system. The processing circuitry may comprise or be a component of a larger processing circuitry implemented with one or more processors. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that can perform calculations or other manipulations of information.

The processing circuitry may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 5:
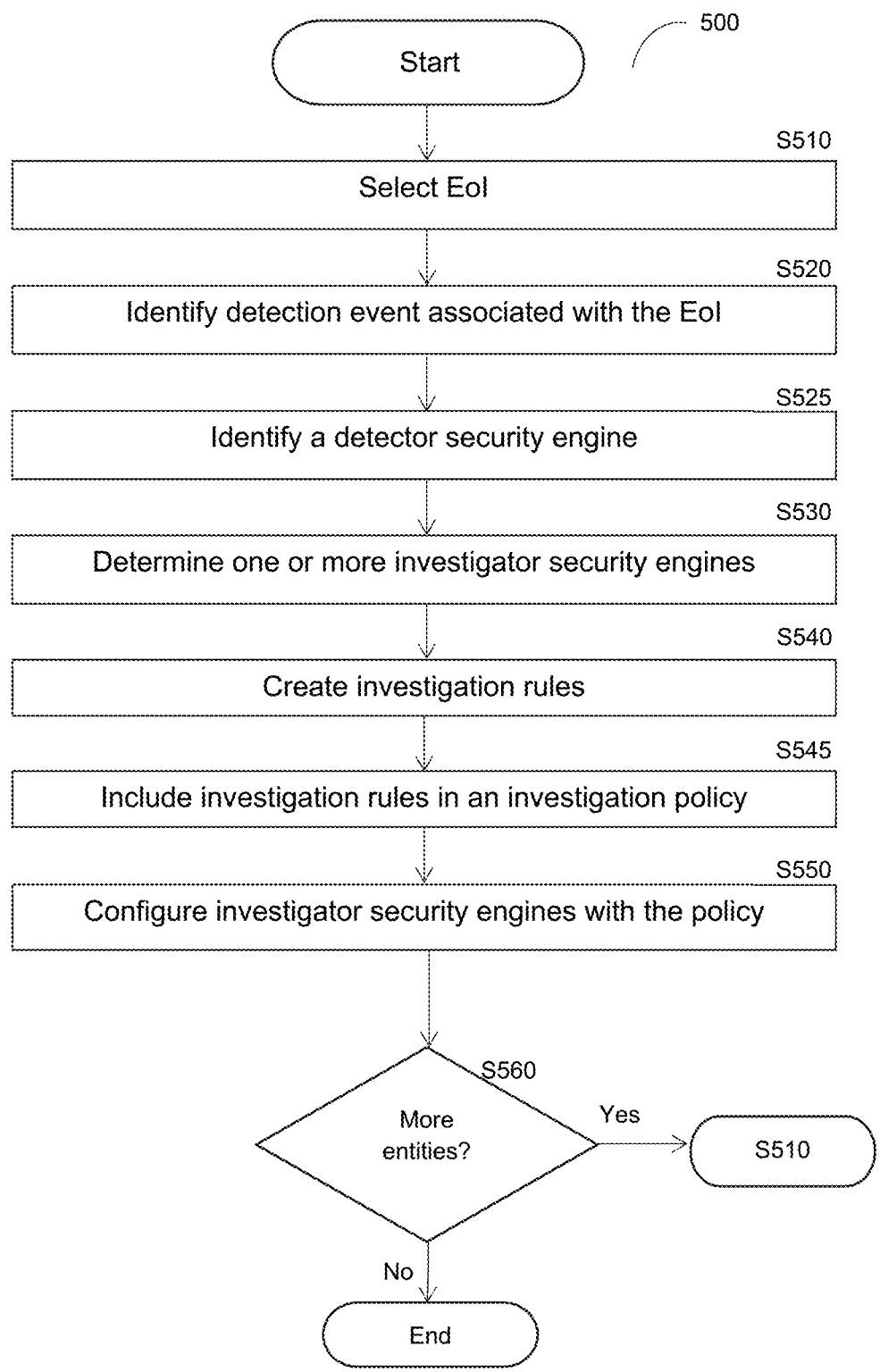
FIG. 5 illustrates a flowchart depicting a method for generating investigation policies according to an embodiment.

FIG. 5 is an example flowchart 500 illustrating a method for generating investigation policies according to an embodiment. At S510, at least one EoI is selected or otherwise determined. An EoI is the entity that is subject of the investigation policy. In an embodiment, the EoI is included or designated in a detection event that satisfied an investigation trigger rule. In another embodiment, the selected EoI is designated in a risk-chain representing a potential cyber-attack. An EoI may include, for example, a host, a group of hosts, an IP address, a group of IP addresses, a user (a host that a specific user has logged to), and the like.

At S520, a detection event associated with the selected EoI is identified. The detection event is an event that triggers an investigation function or an event that causes the inclusion of the EoI in a risk-chain. At S525, a detector SDE, i.e., an engine that is configured to cause the generation of a detection event, is identified. The identification may be based on a type of a detection event and the security service that provided the signals for the event generation.

At S530, one or more investigator SDEs are determined, based, in part, on the detector SDE. The determination may be based on a correlation of a detector SDE to each investigation detector SDE. As noted above, such correlation can be performed in real-time based on logical connections between engines, type of the threats to be analyzed, timing of the detection event, and so on. In another embodiment, the correlation is based on a set of predefined mapping rules that map a detector SDE to one or more investigator SDEs. Examples for mapping and for the logical connections of a detector to investigator SDE are provided above.

At S540, at least one investigation rule related to the EoI is created. An investigation rule includes one more filters be to applied on attack logs (and, thus, on events) during an investigation phase. The filters may include a source entity (any, specific, or group), a destination entity (any, specific, or group), a time (past, future, or both, relative to a time of the detection event), an application path, and so on. The filters may be set according to the logical connections.

In an example embodiment, a first investigation rule includes investigating all future events performed by the EoI and a second investigation rule includes investigating all past events performed against the EoI. The EoI may be a source (a source of a malicious activity), a destination (a victim of a malicious activity), or both. Examples for investigation rules are provided above. It should be noted that S530 and S540 may be performed at the same time.

At S545, the investigation rules are encapsulated or defined as an investigation policy associated with the EoI. The policies may be saved in a central repository to be shared with other applications or reused when the EoI is later encountered.

At S550, the determined investigator SDEs are set with or configured with the respective investigation policy. That is, each investigator SDE is configured to process attack logs and to generate, responsive to such processed attack logs, signals as determined by the investigation policy. A security application is then configured to correlate signals from the investigator SDEs into investigation events. For example, such investigation events would include information on activity (legit or malicious) performed (or that will be performed) by or against the EoI. In an embodiment, S550 includes selecting one or more security products as the source for attack logs to be processed. The selection is based on the performance score of a security product.

It should be noted that, in an embodiment, S520 through S550 are performed for each EoI. Thus, at S560, it is checked if there are additional EoIs (in detection event or risk-chain) that require processing. If so, execution returns to S510; otherwise, execution ends.

Figure 6:
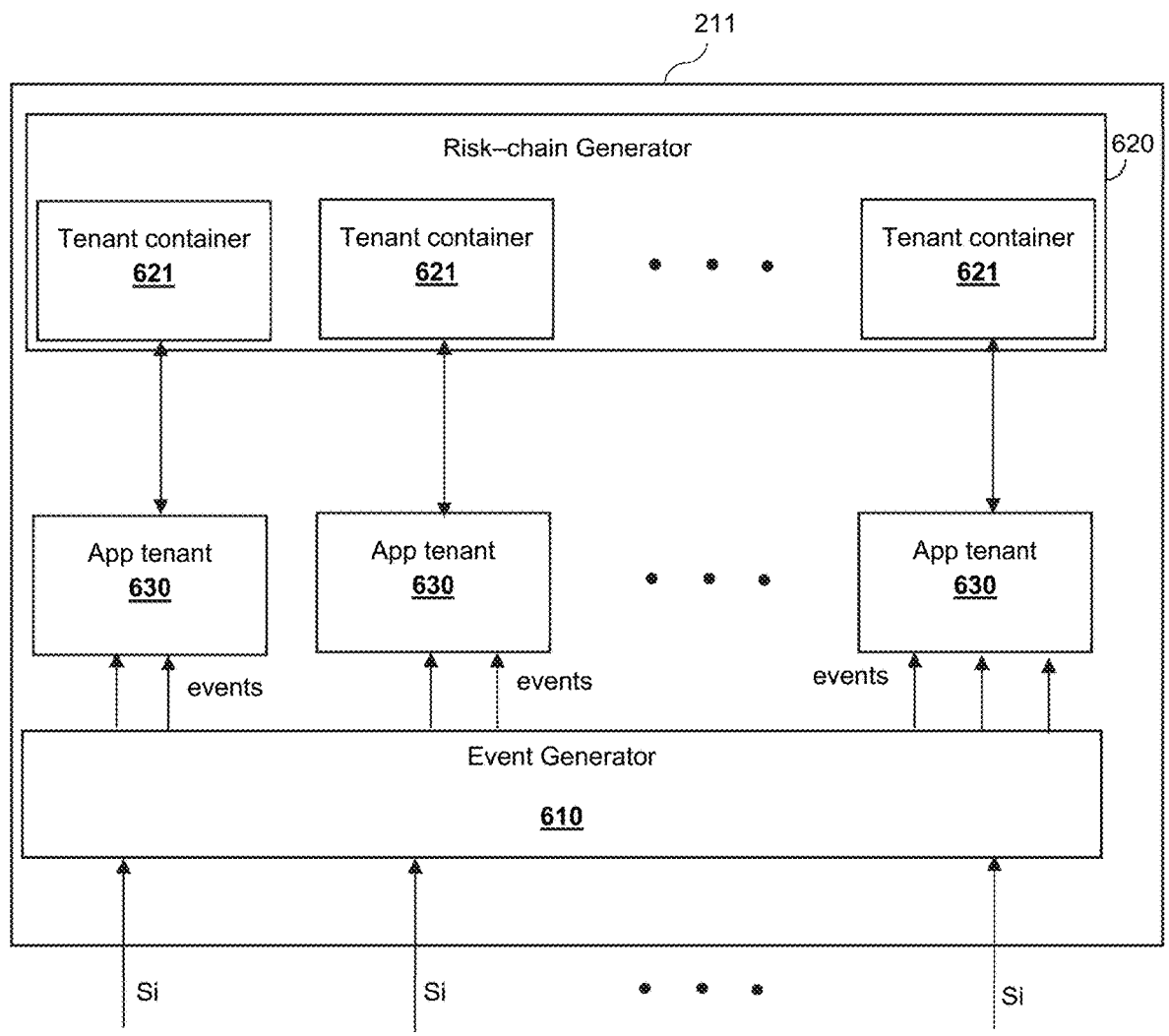
FIG. 6 is a diagram illustrating the operation of a security application for generating risk-chains according to an embodiment.

FIG. 6 shows an example diagram illustrating the operation of a security application 211 for generating risk-chains according to an embodiment. The security application 211 includes at least an event generator 610 and a risk-chain generator 620. The risk-chain generator 620 is configured to at least generate risk-chains, compute their risk levels, and identify elements and traffic flows associated with each risk-chain.

In some embodiments, the security application 211 is configured to generate risk-chains for a specific tenant. In such embodiments, the security application 211 is configured with a plurality of application (app) tenants 630, each of which is associated with a different tenant. In addition, the risk-chain generator 620 is configured with a plurality of tenant containers 621, each of which is associated with an application tenant 630. In an embodiment, a tenant is a protected object (e.g., one or more of the objects 130).

The event generator 610 is configured to interface with the security services 221 to collect or otherwise receive signals. The event generator 610 is also configured to generate events based on the received signals and the event rules. The event generator 610 is further configured to distribute the events among the different application tenants 630 based on the events' respective relevancies to a specific application tenant 630. The relevance of an event to a specific application tenant 630 may be based on, but not limited to, the IP address of the tenant. For example, an event with a source IP address "XYZ" will not be sent to an application tenant of a tenant having an IP address "ABC".

Each application tenant 630 may initially filter incoming events using filters for determining each event's relevancy or severity and may forward all or some of the incoming events to a respective tenant container 620. In addition, each application tenant 630 can receive, from the risk-chain generator 620, risk-chains generated for the respective tenant.

Each tenant container 621 aggregates the received events. In an embodiment, the risk-chain generator 620 is configured to analyze events in a respective tenant container 621 to generate a risk chain. The analysis, in an embodiment, is performed using a set of RCG rules, which are logical rules defined for a respective tenant, for a type of cyber-attack, or for a combination thereof. In an example embodiment, the RCG rules include: threat-mapping rules to map events to a global threat type and grouping events with the same threat type in a container 621, and matching rules to identify correlations between group of events.

Threat-mapping rules are designed to map grouped events to a global threat type. A global threat type defines a certain type of malicious activity and may include, for example, action, control, propagation, probe, and social engineering. In an embodiment, the mapping is based on a threat characteristic which is determined based on the type of SDE within the security service 221 that was responsible for detecting the threat. For example, events that represent an action will be mapped into an action global threat type. Such events can result from signals related to data-exfiltration patterns, drop zone activity behavior, or DoS, which are respectively detected by an exfiltration pattern SDE (of an IDS security service), a drop zone SDE (of a NBA security service), and a DoS SDE (of an IDS security service).

In an embodiment, the events are mapped using a classifier trained using a classification model representing attack logs of SDEs, threat types, or both. Any event can be mapped or classified to a respective threat based on the global threat type.

Each attack-type can be represented with one or more global threat types. For example, an APT campaign is a multi-stage attack, where each stage in the attack may be represented by a different global threat type.

In one embodiment, a global threat type is associated with a risk-chain group. The risk-chain group may include, for example, effect only, cause only, and cause-and-effect. In an example configuration, global threat types of: action, control, propagation, probe, and social engineering, are respectfully associated with the following risk-chain groups: effect only, cause-and-effect, cause-and-effect, cause-and-effect, and cause only.

The cause risk-chain group includes all events that can trigger another event(s) in a different risk-chain group (e.g., an effect group). The effect risk-chain group includes all events that are considered to result from event(s) classified to the cause risk-chain group. The cause-and-effect group includes events that are both the cause of and result of another event(s). Each of the cause-and-effect group events may be the cause of one or more events, and may be the result of one or more other events, that is, any or all of the causes of a cause-and-effect group event may not be the result of the cause-and-effect group event.

The matching rules are defined, per global threat type, to correlate between events. In an embodiment, the matching rules are applied on events mapped and grouped into a global threat type to detect transitions from one global threat type to another. A transition may be a change from one global threat type to another or a self-loop, i.e., repeated event of the same threat group. Each such transition is a segment (new or updated) in the risk-chain. The transition is a state action in a state-machine utilized to maintain a life-cycle of the risk-chain.

The matching rules are further defined to determine a risk level for a segment. A segment risk level determines correlation strength between "cause" and "effect" of each combination of global threat types (e.g., propagation to action). In an embodiment, the segment risk level is based on any of, or a combination of: a transition from global threat type to another, a risk-chain group, an attack type, and network relationships. The segment risk level may be set to a low, high, or medium level. Alternatively, the segment risk level may be a numerical value (e.g., an integer number from 0-9).

A matching rule is defined with at least one matching condition. The matching rule is satisfied when one or more of the defined matching conditions are met. As an example, the matching conditions may apply on an entity type, a device type, a device group, an event order, and the like. In an example embodiment, a matching rule may be presented as follows:

If $MC_1 \oplus MC_2 \oplus \ldots MC_p$;
then
   Segment_Risk_Level=$L_1$; and
   State_Action=TRANSITION The parameters $MC_j$ (j=1 , , , p) are matching conditions, the operator $\oplus$ is a logical operator that may be OR, AND, NOT, XOR, and the like. The Segment_Risk_Level and State_Action parameters are the segment risk level and state action, respectively, that are discussed above.

In an embodiment, a matching condition of an entity type may be a source or destination of an event. The source and destination may be designated by a host name, an IP address, a user name, a group of IP addresses, a port number, a L4 protocol, a L7 protocol, and the like.

The device type matching condition indicates whether the match criteria refer to a specific host. A host may be defined by its host name or by a host IP address. The device group matching condition indicates if the matching condition should be applied to a single device (e.g., a host) or to a group of devices (group of hosts). When applied on a group of devices, the matching rule, once processed, can be utilized to identify correlations between any two devices in two different groups of devices. In an embodiment, the device group is part of the device type matching condition.

The event order matching condition indicates if the matching should be sensitive to the times at which the events occurred or were generated. It should be noted that any of the matching conditions of event order, a device group, and a device type, may be set with a binary value.

The following example table (Table 3) demonstrates matching rules for correlating events transitioning from a Propagation to Action global threat type.

TABLE 3

| MC | Entity Type | Device Type | Event Order | Device Group | Segment Risk Level | State Action |
|---|---|---|---|---|---|---|
| 1. | Same Destination; and Different Source | Host | Yes | N/A | Low | Transit |
| 2. | Source = Destination | Host | Yes | N/A | High | Transit |
| 3. | Same Destination; and Same Source | Host | Yes | N/A | Med | Transit |

In the first example matching rule (1), the matching conditions are same destinations and different sources as an entity type; a host as a device type; and that the event order is required. Matching rule (1) will be satisfied if the events (those that are mapped to Propagation and those that are mapped to Action) should have the same destination (and different sources), where a first event (mapped to a propagation threat type) should have occurred before a second event (mapped to an action threat type). The matching rule relates to a device type Host. Because in this case the correlation between propagation and action is not certain, the segment risk level is set to a low level.

The matching rule (1) may identify cases where an attacker took control over a host through a remote desktop channel (e.g., indicated by an abnormal remote admin tool activity event) and, subsequently from another host (indicated by a file upload event) that attempted to upload a file to the same destination host.

In the second example matching rule (2), the matching conditions are: the source of an event is the same as the destination of another event; a host as a device type; and that the event order is required. If the matching rule (2) is satisfied, then a second event (mapped to an Action threat type) should originate from a source that is equal to the destination of a second event (mapped to a Propagation threat type). In addition, the first event should have occurred before the second event. The matching rule relates to a host device. The correlation here demonstrates a clear cause-and-effect case; thus the segment risk level is set to a high level.

The matching rule (2) may identify cases such as memory scraper malware (reported by a malware detection event) propagated into a host device, which subsequently sends confidential information that was "scraped" from that host device's memory into another host (indicated by an action event). In this case, the destination of the propagation is the same as the source of the leak (i.e., the host sending the information).

In the third example matching rule (3), the matching conditions are: same destination and same source as an entity type; a host as a device type; and that the event order is required. The matching rule (3) is satisfied when two events have the same destination and source; and a first event (mapped to propagation) occurred before a second event (mapped action). The matching rule (3) relates to a specific host. The segment risk level is set to a medium (med) level.

The matching rule (3) may identify cases where the same source host establishes an abnormal remote desktop channel (indicated by a remote channel event) and then a file upload (indicated by an abnormal file upload event) to the same host (destination). The remote channel event is a propagation threat and the file upload event is an action threat. Thus, the matching rule (3) correlates between propagation and action events.

The following example table (Table 4) demonstrates matching rules for correlating repeated events mapped (or classified) to the same global threat type. In this example, the global threat type is an action type.

TABLE 4

| MC | Entity Type | Device Type | Event Order | Device Group | Segment Risk Level | State Action |
|---|---|---|---|---|---|---|
| 4. | Same Destinations | 'Host | N/A | N/A | Med | Self-loop |
| 5. | Source = Destination | Host | Yes | N/A | High | Transit |

In the example matching rule (4), the matching conditions are: same destinations as an entity type; a host as a device type; and that the event order is not required. If the matching rule (4) is satisfied, the events should have the same destination address of a host (and different sources). The segment risk level is set to a medium (med) level.

The matching rule (4) may identify cases where activity on the same destination entity is determined, for example, infected hosts send confidential data to another host (e.g., to a drop zone host), or attempt to cause a DoS to the other host. As a result, the destination entity can be considered as a host that is under high risk (targeted by different entities), or a host that has become critical, and should be investigated, because confidential data has been leaked to such host.

In the example matching rule (5), the matching conditions are: destination of one security event should be equal to the source of another event (i.e., the targeted entity become a source of an event); a host as a device type; and that the event order is required. If the matching rule (5) is satisfied, a source of a second event is the same as the destination of a first event, where events relate to a host address of a device. In addition, the first event should occur before the second event. In this case, all events are classified as an action global threat. The segment risk level is set to a high level. The matching rule (5) may identify cases where a chain data leakage activity occurs. That is, cases where stolen confidential data is forward from one drop-point to another.

Upon processing the events, in a tenant container, using the RCG rules, the risk-chain generator 620 outputs a risk-chain. As noted above, risk-chain is constructed to include the global threat types and segments. A segment may represent a transition from one global threat type to another or a self-loop in a global threat type. A segment may be, for example, a transition from a propagation to action global threat type.

It should be noted that any generated risk-chain can be updated as new events are gathered in the respective container. Aging risk-chains are ignored or deleted. In an embodiment, the risk-chain generator 620 is configured to maintain a data structure including at information related to a risk chain.

Returning to FIG. 6, in an embodiment, the risk-chain generator 620 is configured to operate in two different modes: regular and pro-active. In the regular mode, the risk-chain generator 620 is configured create risk-chains using predefined sets of RCG rules and the predefined workflow rules. In the pro-active mode, the risk-chain generator 420 may override, based on the generated risk-chains, some of the predefined event-correlation rules, workflow rules, or both. In the pro-active mode, and in order to make pro-active security decisions, the risk-chain generator 620 is configured to control security functions (e.g., investigation, and mitigation) performed by the respective security application 211.

For example, the risk-chain generator 620 may cause or instruct a security application 211 to make an early transition from a detection phase to an investigation phase, to initiate a mitigation phase before the pre-defined event-correlation rules, workflow rules, or both of the application are met, and to send instructions to initiate these phases. In an embodiment, such a control can be achieved by overriding some of the workflow rules, event-correlation rules, or a combination thereof, executed by each security application based on the information learned from the risk-chains. The event-correlation and workflow rules are further discussed in the above-referenced '020 application.

It should be noted that information in different tenant containers 620 in the same security application or in different security applications 211 can be shared in order to create and update a higher level risk-chain. That is, cross tenant risk chains, cross application risk-chains, or both may be generated according to the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating policies for investigating cyber-security attacks, comprising:
   selecting at least one security product as a source for attack logs input to at least one investigator security engine, wherein the selection is based on a performance score of the at least one security product;
   generating a risk chain for a multivector attack based on information received from the at least one security product;
   determining a risk level for the risk chain;
   selecting at least one entity of interest (EoI) designated in the risk-chain representing a potential cyber-attack;
   determining at least one detection event associated with the at least one EoI;
   processing the at least one detection event to create a plurality of investigation rules, wherein each of the plurality of investigation rules includes a set of filters utilized to identify malicious activity against the at least one EoI; and
   defining an investigation policy for the EoI, wherein the defined investigation policy includes the plurality of investigation rules.

2. The method of claim 1, wherein selecting the at least one EoI further comprises: selecting an entity designated in an event that triggered an investigation function.

3. The method of claim 2, wherein the at least one detection event is any one of: an event that causes the inclusion of the at least one EoI in the risk-chain, and the event that triggered an investigation function.

4. The method of claim 1, further comprising:
   defining at least one filter for each of the plurality of investigation rules.

5. The method of claim 4, wherein the at least one filter for each of the plurality of investigation rules is based on any one of: a source entity, a destination entity, a time, and application path.

6. The method of claim 1, wherein processing the at least one detection event to create the plurality of investigation rules further comprises:
   identifying a detector security engine responsible for causing generation of the at least one detection event; and
   determining the at least one investigator security engine.

7. The method of claim 6, further comprising:
   configuring the at least one investigator security engine and the detector security engine to carry out the investigation policy.

8. The method of claim 6, wherein the at least one investigator security engine and the detector security engine are any of: the same security engine, and different security engines, wherein each of the at least one investigator security engine and the detector security engine is configured to detect and investigate threats by processing attack logs generated by the at least one security product communicatively connected thereto.

9. The method of claim 8, further comprising:
   normalizing the attack logs into a unified data structure, wherein the unified data structure is processed by the at least one investigator security engine.

10. The method of claim 1, wherein the malicious activity related to the at least one EoI comprises at least one of: past malicious activity performed against at the least one EoI, past malicious activity performed by the at least one EoI, future malicious activity to be performed by the at least one EoI, and future malicious activity performed against at least one EoI.

11. A non-transitory computer readable medium having stored thereon instructions for causing one or more processing units to execute a method, the method comprising:
   selecting at least one security product as a source for attack logs input to at least one investigator security engine, wherein the selection is based on a performance score of the at least one security product;
   generating a risk chain for a multivector attack based on information received from the at least one security product;
   determining a risk level for the risk chain;
   selecting at least one entity of interest (EoI) designated in the risk-chain representing a potential cyber-attack;
   determining at least one detection event associated with the at least one EoI;
   processing the at least one detection event to create a plurality of investigation rules, wherein each of the plurality of investigation rules includes a set of filters utilized to identify malicious activity against the at least one EoI; and
   defining an investigation policy for the EoI, wherein the defined investigation policy includes the plurality of investigation rules.

12. A system for generating policies for investigating cyber-security attacks, comprising:
   a processing circuitry; and
   a memory, the memory containing instructions that, when executed by the processing circuitry, configure the system to:
   select at least one security product as a source for attack logs input to at least one investigator security engine, wherein the selection is based on a performance score of the at least one security product;
   generate a risk chain for a multivector attack based on information received from the at least one security product;
   determine a risk level for the risk chain;
   select at least one entity of interest (EoI) designated in the risk-chain representing a potential cyber-attack;
   determine at least one detection event associated with the at least one EoI;
   process the at least one detection event to create a plurality of investigation rules, wherein each of the plurality of investigation rules includes a set of filters utilized to identify malicious activity against the at least one EoI; and
   define an investigation policy for the EoI, wherein the defined investigation policy includes the plurality of investigation rules.

13. The system of claim 12, wherein the system is further configured to select an entity designated in an event that triggered an investigation function.

14. The system of claim 13, wherein the at least one detection event is any one of: an event that causes the inclusion of the at least one EoI in the risk-chain, and the event that triggered an investigation function.

15. The system of claim 12, wherein the system is further configured to:
define at least one filter for each of the plurality of investigation rules.

16. The system of claim 15, wherein the at least one filter for each of the plurality of investigation rules is based on any one of: a source entity, a destination entity, a time, and application path.

17. The system of claim 12, wherein processing the at least one detection event to create the plurality of investigation rules further comprises:
identifying a detector security engine responsible for causing generation of the at least one detection event; and
determining the at least one investigator security engine.

18. The system of claim 17, wherein the system is further configured to:
configure the at least one investigator security engine and the detector security engine to carry out the investigation policy.

19. The system of claim 17, wherein the at least one investigator security engine and the detector security engine are any of: the same security engine, and different security engines, wherein each of the at least one investigator security engine and the detector security engine is configured to detect and investigate threats by processing attack logs generated by at least one security product communicatively connected thereto.

20. The system of claim 19, wherein the system is further configured to:
normalize the attack logs into a unified data structure, wherein the unified data structure is processed by the at least one investigator security engine.

21. The system of claim 12, wherein the malicious activity related to the at least one EoI comprises at least one of: past malicious activity performed against at the least one EoI, past malicious activity performed by the at least one EoI, future malicious activity to be performed by the at least one EoI, and future malicious activity performed against at least one EoI.

* * * * *